Patented Oct. 18, 1938

2,133,782

UNITED STATES PATENT OFFICE 2,133,782

VULCANIZATION OF RUBBER

Joy G. Lichty, Stow, Ohio, assignor to Wingfoot Corporation, Wilmington, Del., a corporation of Delaware No Drawing. Application June 30, 1936, Serial No. 88,210

20 Claims. (Cl. 18—53)

This invention relates to the vulcanization of rubber. More particularly it relates to the vulcanization of rubber in the presence of accelerators which are the reaction products of mercaptoaryl thiazoles and alpha chloracyl chlorides.

The objects of the invention include the provision of a new class of vulcanization accelerators, the vulcanization of rubber in the presence of such new accelerators, and the obtainment of rubber products by said vulcanization. Other objects and advantages will appear as the description proceeds.

It is known that mercaptothiazoles and certain derivatives of mercaptothiazoles are vulcanization accelerators. These are widely used in the art.

By the present invention, it has been discovered that valuable accelerators are obtained when mercaptoaryl thiazoles, preferably in the form of anhydrous alkaline salts, are reacted with compounds having the formula

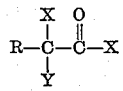

in which X in each case is a halogen atom, Y is a halogen atom or hydrogen, and R is an alkyl, aryl, or aralkyl radical or hydrogen. These alkyl, aryl, or aralkyl groups may be either substituted or unsubstituted.

The process of preparing the accelerators is simple although care must be exercised. Thus, because of the fact that the alpha halo acyl halides tend to hydrolyze in the presence of water, the reaction should be conducted under substantially anhydrous conditions. Also, the reaction is preferably carried out in a liquid medium, such as benzene, which will not react with the alpha halo acyl halide under the conditions of the reaction. Heating is generally desirable although not always necessary.

Representative of the mercaptoaryl thiazoles, which preferably in the form of anhydrous alkaline salts, may be used in the practice of the invention are 1-mercaptobenzothiazole, 1-mercapto 5-nitrobenzothiazole, 1-mercapto-5-methyl benzothiazole, 1-mercapto 3,5-dimethyl benzothiazole, 1-mercapto-3-phenyl benzothiazole, 1-mercapto-5-ethoxy benzothiazole, 1-mercapto-3-methyl benzothiazole, 1-mercapto-4-chlorbenzothiazole, 1-mercapto-4-nitrobenzothiazole, etc. and the similar 1-mercaptonapthathiazoles. Preferred are the 1-mercapto aromatic thiazoles of the benzene and naphthalene series, and, of those, 1-mercaptobenzothiazole.

Any of these may be reacted with chloracyl chlorides conforming to the structural formula previously given. Following are the structural formulae of some specific representative compounds:

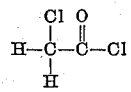
Chlor acetyl chloride

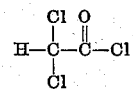
Dichlor acetyl chloride

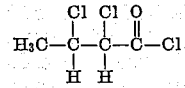
Alpha chlor beta chlor butyryl chloride

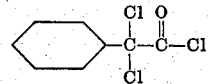
Alpha-phenyl dichloro acetyl chloride

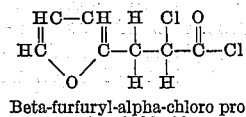
Beta-furfuryl-alpha-chloro propionyl chloride

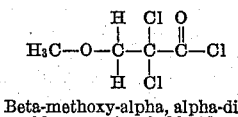
Beta-methoxy-alpha, alpha-dichloro propionyl chloride

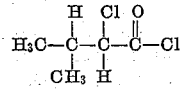
Beta methyl-alpha-chloro butyryl chloride

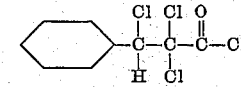
Beta-phenyl-beta-chloro-alpha, alpha dichloro propionyl chloride

All of the foregoing compounds have one or two chlorine atoms substituted in the alpha position and another in the acyl group. These are the reactive chlorine atoms. The materials may also contain chlorine atoms on the beta or other positions. These are not so reactive as the alpha chlorine atoms, and so tend to be inert. However, their presence is not detrimental. The compounds listed are merely representative and not limitative of the invention. Any other alpha chlor acyl chloride may be used in the practice of the invention. Also, chlorine may be replaced by other halogens, such as bromine. However, the alpha chlor aliphatic acyl chlorides are preferred, and of these, the chlor acetyl chlorides are particularly desirable in the practice of the invention.

The following examples will serve to illustrate the practice of the invention.

EXAMPLE 1

A suspension of 113.4 grams of anhydrous sodium benzothiazyl mercaptide in 600 cc. of dry benzene was stirred and maintained at a temperature of 40° C. or below during the slow addition of a solution of 33.9 grams of chloracetyl chloride in 100 cc. of dry benzene. The resulting solid was filtered off. It was then added to 550 cc. of benezene, the mixture heated to boiling, and the solid material remaining filtered off while hot. This benzene extraction was repeated several times after which the various benzene filtrates were consolidated. Evaporation of these benzene filtrates gave 45.3 grams of an impure red dye, decomposing over the range of 97–150° C. The benzene insoluble residue was then washed with water to remove the sodium salts after which there were left 60.1 grams of a deep blue benzene insoluble material decomposing at 205–215° C. The total yield of organic material was 105.1 grams.

Attempts to purify these fractions led mainly to the conclusion that the product was a complex mixture. The nature and quantities of the constituent compounds were indeterminate. However, there was some evidence to support the belief that one of the principal compounds present resulted from the reaction of the sodium benzothiazyl mercaptide at both chlorine atoms to yield a material having the formula

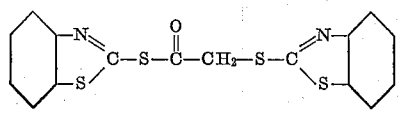

EXAMPLE 2

A suspension of 62.3 grams of anhydrous sodium benzothiazyl mercaptide in 300 cc. of benzene was stirred during the slow addition of a solution of 14.8 grams of dichloroacetyl chloride in 100 cc. of dry benzene. The product was then heated on a steam bath under a reflux condenser for one hour. The solid was filtered from the hot benzene solution. Evaporation of this solution gave 39.6 grams of solid. An additional extraction in hot chloroform of the solid which failed to dissolve in the mother liquor gave 12.1 grams more of the crude product, making a total yield of 51.7 grams.

Other mercaptoaryl thiazoles and other alpha chlor acyl chlorides may be substituted for the materials of the examples. The mercapto aryl thiazoles are preferably used in the form of the sodium salts, as in the examples, or as other reactive salts, such as the potassium, calcium, and magnesium salts. The free mercapto aryl thiazoles also may be used, generally in conjunction with a suitable catalyst.

Other products typical of the invention are the reaction product of sodium 5-nitro benzothiazyl mercaptide and alpha chlorbenzyl acetyl chloride, the reaction product of potassium 5-ethoxy benzothiazyl mercaptide and alpha chloropropionyl chloride, the reaction product of sodium beta-napthathiazyl mercaptide and beta-furfuryl-beta-chloro-alpha-chloropropionyl chloride, the reaction product of potassum 4-chlor benzothiazyl mercaptide and alpha-chlorobutyryl chloride, etc.

The compounds of the invention may be employed as accelerators in most of the ordinary rubber formulae. The following is one specific formula in which they have been found by test to yield good results.

| | Parts by weight |
|---|---|
| Extracted pale crepe | 100 |
| Zinc oxide | 5 |
| Sulphur | 3 |
| Stearic acid | 1.5 |
| Accelerator | 0.5 |

Representative materials were mixed with rubber in accordance with this formula. Samples were cured and tested. Typical results follow.

| Cure in mins. at ° F. | Tensile kgs./cm.² | Ult. elg., percent | Modulus in kgs./cm.² at— | |
|---|---|---|---|---|
| | | | 500% | 700% |
| Benzene soluble portion of product of Example 1 | | | | |
| 40/285 | 52 | 920 | 8 | 16 |
| 60 | 65 | 905 | 10 | 21 |
| 80 | 80 | 880 | 12 | 26 |
| 120 | 95 | 880 | 13 | 31 |
| Benzene insoluble portion of product of Example 1 | | | | |
| 40/285 | 50 | 900 | 8 | 18 |
| 60 | 81 | 915 | 11 | 23 |
| 80 | 95 | 920 | 12 | 27 |
| 120 | 88 | 875 | 13 | 29 |

It is readily seen from these data that there is little difference in the accelerating properties of these two portions of the reaction product of chloracetyl chloride and sodium benzothiazyl mercaptide, although they are distinguishable materials as is evidenced by the differences in solubility, color, and decomposition temperature. Equally, good results are obtainable by adding to the previous formula 0.2 part by weight of diphenyl guanidine. The test data follow.

| Cure in mins. at ° F. | Tensile kgs./cm.² | Ult. elg., percent | Modulus in kgs./cm.² at— | |
|---|---|---|---|---|
| | | | 500% | 700% |
| Benzene soluble portion of product of Example 1 and diphenylguanidine | | | | |
| 20/260 | 144 | 805 | 18 | 70 |
| 40 | 194 | 755 | 32 | 117 |
| 60 | 204 | 730 | 41 | 174 |
| 80 | 210 | 725 | 43 | 183 |
| Benzene insoluble portion of product of Example 1 and diphenylguanidine | | | | |
| 20/260 | 178 | 825 | 21 | 84 |
| 40 | 188 | 740 | 32 | 144 |
| 60 | 210 | 720 | 39 | 174 |
| 80 | 212 | 715 | 47 | 193 |

The combined use of the products of the invention and diphenylguanidine is shown to yield excellent cures.

It is to be understood that the invention includes the use of the accelerating reaction products as such or separated into components. It also includes the use of the reaction products by themselves or in combination with other accelerators, particularly, the basic nitrogen-containing accelerators, such as di ortho tolyl guanidine, p-p′ diamino diphenyl methane, butyl ammonium oleate, diphenyl guanidine neutral phthalate, urea and 2-4 diamino diphenyl amine.

Thus while only the preferred forms of the invention have been described in detail, it will be apparent to those skilled in the art that various modifications may be made therein without departing from the spirit of the invention or the scope of the appended claims in which it is intended to cover by suitable expression all forms of patentable novelty residing in the invention.

I claim:

1. The reaction product obtainable by reacting a mixture consisting of a mercaptoaryl thiazole of the benzene and naphthalene series and an alpha chloracyl chloride under substantially anhydrous conditions.

2. The reaction product obtainable by reacting a mixture consisting of a mercapto aryl thiazole of the benzene and naphthalene series and a compound having the formula

in which X is halogen, Y is selected from the group consisting of halogens and hydrogen, and R is selected from the group consisting of alkyl, aralkyl, and aryl groups and hydrogen, the said reaction being conducted under substantially anhydrous conditions.

3. The reaction product obtainable by reacting a mixture consisting of a mercapto aryl thiazole of the benzene and naphthalene series and an alpha monochloracyl chloride under substantially anhydrous conditions.

4. The reaction product obtainable by reacting a mixture consisting of a mercapto aryl thiazole of the benzene and naphthalene series and an alpha dichloracyl chloride under substantially anhydrous conditions.

5. The reaction product obtainable by reacting a mixture consisting of a mercapto benzo thiazole and chloracetyl chloride under substantially anhydrous conditions.

6. The reaction product obtainable by reacting a mixture consisting of a mercaptobenzothiazole and dichloracetyl chloride under substantially anhydrous conditions.

7. The reaction product of a mixture consisting of an anhydrous alkali metal salt of a mercapto aryl thiazole of the benzene and naphthalene series and a compound having the formula

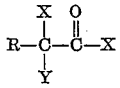

in which X is halogen, Y is selected from the group consisting of halogens and hydrogen, and R is selected from the group consisting of alkyl, aralkyl, and aryl groups and hydrogen.

8. The reaction product of a mixture consisting of an anhydrous alkali metal salt of a mercapto aryl thiazole of the benzene and naphthalene series and an alpha chloracyl chloride.

9. The process of treating rubber which comprises vulcanizing it in the presence of an accelerator which is a reaction product of a mixture consisting of an anhydrous alkaline salt of a mercapto aryl thiazole of the benzene and naphthalene series and an alpha chloracyl chloride.

10. The process of treating rubber which comprises vulcanizing it in the presence of an accelerator which is a reaction product of a mixture consisting of an anhydrous mercaptobenzothiazole and a compound having the formula

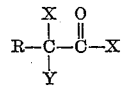

in which X is halogen, Y is selected from the group consisting of halogens and hydrogen and R is selected from the group consisting of alkyl, aralkyl, and aryl groups, and hydrogen.

11. The process of treating rubber which comprises vulcanizing it in the presence of an accelerator which is a reaction product of a mixture consisting of anhydrous sodium benzothiazyl mercaptide and an alpha chlor aliphatic acyl chloride.

12. The process of treating rubber which comprises vulcanizing it in the presence of an accelerator which is a reaction product of a mixture consisting of an anhydrous alkali metal salt of a mercapto aryl thiazole of the benzene and naphthalene series and a compound having the formula

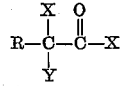

in which X is halogen, Y is selected from the group consisting of halogens and hydrogen and R is selected from the group consisting of alkyl, aralkyl, and aryl groups, and hydrogen.

13. A rubber product which has been vulcanized in the presence of an accelerator which is a reaction product obtainable by reacting a mixture consisting of a mercapto aryl thiazole of the benzene and naphthalene series and an alpha chlor acyl chloride under substantially anhydrous conditions.

14. A rubber product which has been vulcanized in the presence of an accelerator which is a reaction product of a mixture consisting of an anhydrous alkaline benzothiazyl mercaptide and a compound having the formula

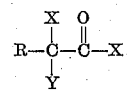

in which X is halogen, Y is selected from the group consisting of halogens and hydrogen, and R is slected from the group consisting of alkyl, aralkyl, and aryl groups, and hydrogen.

15. A rubber product which has been vulcanized in the presence of an accelerator which is a reaction product of a mixture consisting of an anhydrous alkali metal salt of a mercapto aryl thiazole of the benzene and naphthalene series and an alpha chloracyl chloride.

16. A rubber product which has been vulcanized in the presence of an accelerator which is a reaction product of a mixture consisting of an anhydrous alkali metal salt of a mercapto aryl thiazole of the benzene and naphthalene series and a compound having the formula

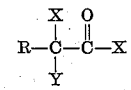

in which X is halogen, Y is selected from the group consisting of halogens and hydrogen and R is selected from the group consisting of alkyl, aralkyl and aryl groups, and hydrogen.

17. The process of treating rubber which comprises vulcanizing it in the presence of an accelerator which is the benzene insoluble portion of the reaction product of a mixture consisting of anhydrous sodium benzothiazyl mercaptide and chlor acetyl chloride.

18. The process of treating rubber which comprises vulcanizing it in the presence of an accelerator which is the benzene soluble portion of the reaction product of a mixture consisting of anhydrous sodium benzothiazyl mercaptide and chlor acetyl chloride.

19. The process of producing aryl thiazyl sulphide derivatives which comprises reacting under substantially anhydrous conditions and in a liquid medium a mixture consisting of an alkali metal salt of a 1-mercapto aryl thiazole of the benzene and naphthalene series with an alpha chlor acyl chloride.

20. The process of producing benzothiazyl sulphide derivatives which comprises reacting under substantially anhydrous conditions and in a medium of benzene a mixture consisting of sodium benzothiazyl mercaptide and a chlor acetyl chloride.

JOY G. LICHTY.